Nov. 9, 1965    J. T. GIER ETAL    3,216,310

BLACK BODY REFLECTOMETER

Filed June 27, 1960    2 Sheets-Sheet 1

INVENTORS:
JOSEPH T. GIER
ROBERT V. DUNKLE
ROBERT D. RODDICK
BY
ATTORNEYS

Nov. 9, 1965  J. T. GIER ETAL  3,216,310
BLACK BODY REFLECTOMETER
Filed June 27, 1960  2 Sheets-Sheet 2

INVENTORS:
JOSEPH T. GIER
ROBERT V. DUNKLE
ROBERT D. RODDICK
BY
ATTORNEYS

United States Patent Office 3,216,310
Patented Nov. 9, 1965

3,216,310
BLACK BODY REFLECTOMETER
Joseph T. Gier, Los Angeles, Calif., Robert V. Dunkle, Highatt, Victoria, Australia, and Robert D. Roddick, Downey, Calif., assignors to The Regents of the University of California, Berkeley, Calif.
Filed June 27, 1960, Ser. No. 39,128
6 Claims. (Cl. 88—14)

This invention relates to and in general has for its object the provision of a black body radiator or hohlraum of the character disclosed in the Gier et al. Patent No. 2,667,806 of February 2, 1954, but which constitutes an improvement thereof, in that among other things it is possible, with our improved hohlraum, to measure the absolute reflectance of a surface as a function of the angle made by the normal to said surface and the line of sight of the spectrometer.

In the radiator of the Gier et al. patent the test sample forms a continuation and part of the upper interior wall of the hohlraum, the hohlraum being tiltably mounted with respect to the viewing spectrometer so that radiation from either the test sample or radiation directly from the hohlraum can be viewed, but in neither case is it possible to determine the absolute spectral reflectance as a function of the angle between the normal to the surface and the spectrometer line of sight.

One of the objects of this invention is the provision of a hohlraum provided with an angularly adjustable test or reference material support.

Another object of this invention is the provision of a hohlraum of the character above described wherein provision is made for bodily translating said support, as well as for selectively adjusting its angularity.

Still another object of this invention is the provision of a hohlraum of the character above described wherein a sheet of test material can be detachably mounted on one side of the support, and a sheet of reference material can be mounted on another side of said support.

More specifically, the object of this invention is the provision of a black body radiator or hohlraum including: a shaft mount journaled in one side of the hohlraum for rotation on a first axis; a shaft eccentrically journaled in said shaft mount for rotation therein through at least 180° on a second axis paralleling said first axis, and for bodily translation along said second axis; means for detachably securing a sheet of test material to one side of said shaft; means for securing a sheet of reference material to another side of said shaft; means for controlling the temperature of said hohlraum and indepedent means for controlling the temperature of said sheet of test material.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings.

Figure 1:
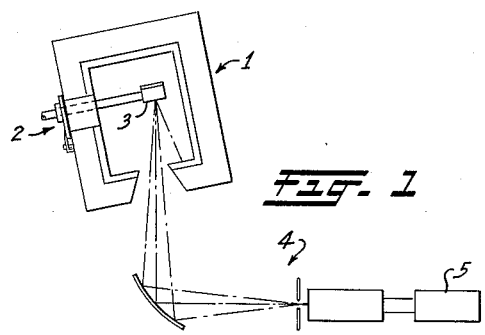
FIG. 1 is a diagrammatic representation of a hohlraum embodying the objects of our invention and its associated spectrometer and recording equipment.
Figure 2:
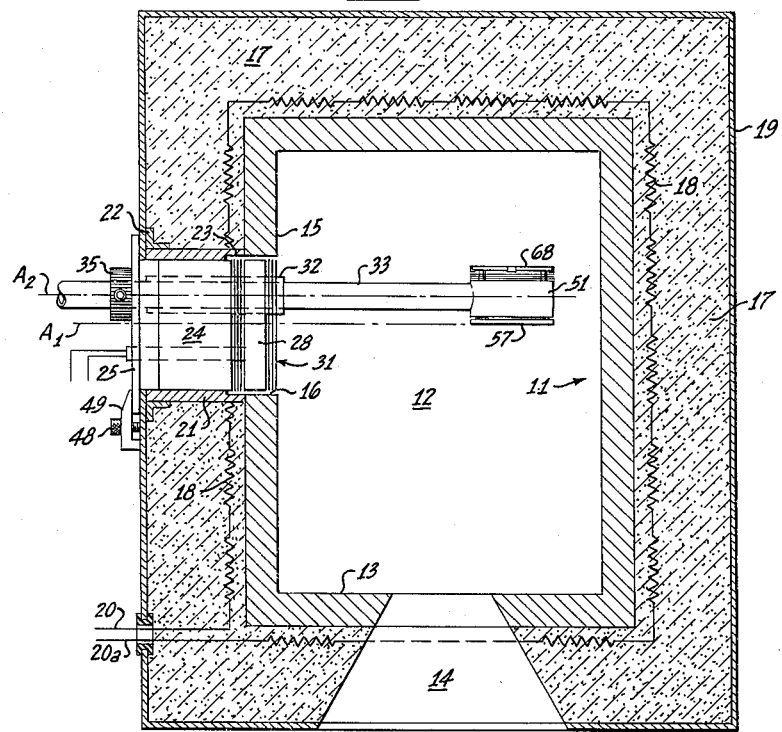
FIG. 2 is a vertical midsection of the hohlraum per se illustrated in FIG. 1.

As best illustrated in FIGS. 1 and 2, the hohlraum of our invention includes a black body radiator assembly generally indicated by the reference numeral 1, an eccentric shaft mounting assembly generally indicated by the reference numeral 2, and a test material and reference material mounting assembly generally designated by the reference numeral 3.

Used in conjunction with such a hohlraum but, per se, forming no part of our invention, is a spectrometer generally designated by the reference numeral 4 and which can be of any well-known construction, and also a recorder 5 which likewise can be of any well-known construction.

*Hohlraum assembly*

The hohlraum assembly includes a closed cylinder 11 conveniently made of polished stainless steel, gold or platinum, and which defines the hohlraum cavity 12. Formed in the lower circular wall 13 of the cylinder is an outwardly flaring window or exit port 14. As is well known in the art, the ratio of the diameter of the exit port 14 to the length of the cavity 12 can be so chosen that the internal surfaces of the cylinder 11 constitute an ideal radiator, that is, radiation leaving the walls of the cavity will be Planckain or "Black Body" radiation for the temperature of the cavity.

Also formed in the cylindrical side wall 15 of cylinder 11 is a circular bearing receiving bore 16.

Surrounding the cylinder 11 is a body 17 of insulating material and embedded therein about the cylinder 11 is an electrical resistance element 18 serving as a heater for controlling the temperature of the cylinder 11 and cavity 12. Enclosing this entire structure is a metal casing 19. Connecting the ends of the resistance element 18 are electrical leads 20 and 20a which in turn are arranged to be connected to a suitable source of current.

Mounted in the body 17 of insulating material coaxially with the opening is a stainless steel bearing sleeve 21. Overlapping and secured to the left end of the sleeve 21 is a flanged ring 22, the flange of this ring being in turn secured to the casing 19. Provided in the right-hand end of the sleeve 21 is a step 23 formed on a diameter equal to the diameter of the bore 16 and constituting a continuation thereof.

*Shaft mounting assembly*

Journaled in the bearing sleeve 21 is a cylinder 24 of insulating material. Secured to the left end of the cylinder 24 and likewise journaled in the sleeve 21 is a disc 25 formed on its outer face with a radially extending flange 26 overlapping the casing 19. Fastened to the right-hand end of the cylinder 24 for rotation therewith are a plurality of spaced radiation shield discs 27. Secured over the discs is an insulating disc 28, and embedded therein is a resistance guard heater 29. Disposed over the right-hand end of the disc 28 and secured thereto is a stack of spaced radiation shield discs 31. As a result of this construction the disc 25, cylinder 24, shield discs 27, disc 28, and shield discs 31 form an integral structure arranged to rotate as a unit within the bearing sleeve 21 about the axis $A_1$. Here it might be noted that the disc 28 and stack of shield discs 31 lie in the plane of the vertical wall 15 of the cylinder 11 and in effect form a continuation thereof.

Figure 5:
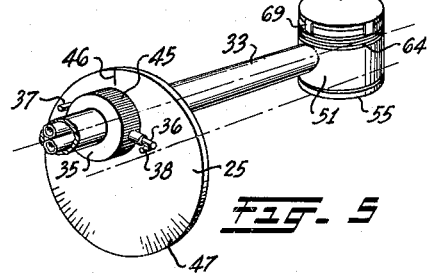
FIG. 5 is a perspective view of the shaft mounting assembly and material mounting assembly shown disassociated from the hohlraum per se.

Mounted in the cylinder 24 and extending partially into the disc 25 and through the shield disc stacks 27 and 31 is shaft bearing sleeve 32. Journaled in the sleeve 32 and in the disc 25 and extending into the cavity 12 is a hollow shaft 33. Mounted on the outer left-hand end of the shaft 33 and secured thereto by a set screw 34 is a collar 35. Screwed into the collar 35 is a radial pin 36 arranged upon the rotation of the shaft 33 in either direction, to engage one of two stop pins 37 or 38 secured to and extending outwardly from the disc 25 (FIG. 5). The angle subtended by the pins 37 and 38 should be such that the rotation of the shaft 33 is limited to 180°.

Figure 3:
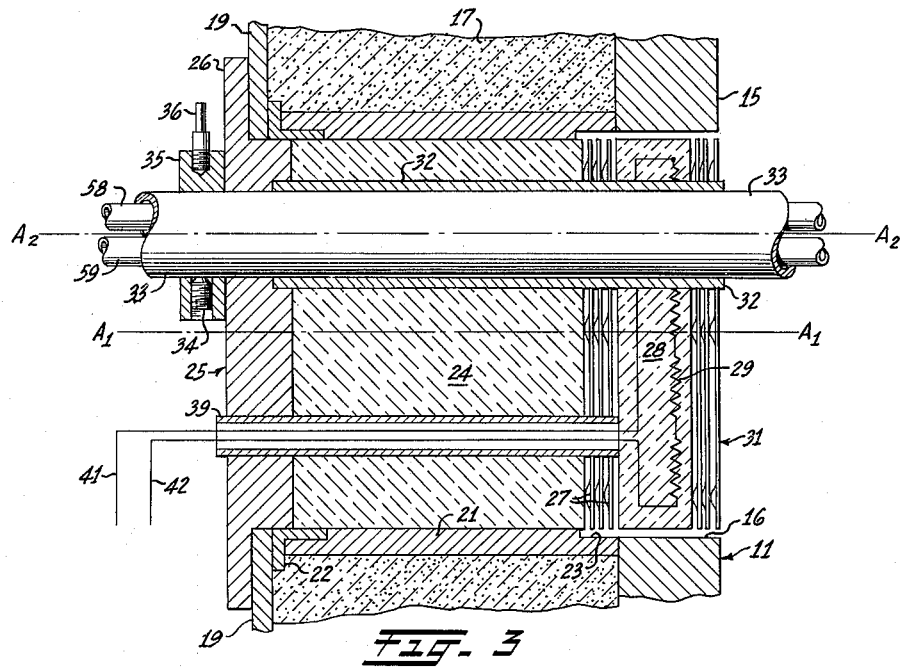
FIG. 3 is an enlarged fragmentary vertical section of a portion of the hohlraum wall and its eccentric shaft mounting assembly.
Figure 4:
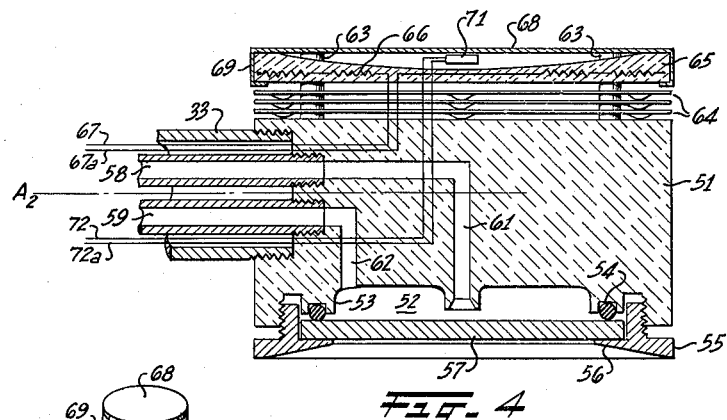
FIG. 4 is an enlarged fragmentary vertical section of the test material and reference material mounting or support assembly.

Extending through the shaft mounting assembly is a tube 39 and threaded therethrough are flexible electric leads 41 and 42. The inner ends of the leads 41 and 42 as best indicated in FIG. 3 are connected to the opposed ends of the resistance guard heater 29. The outer ends of the leads 41 and 42 are connected in any well-known manner to a source of current through a current control device.

Scored or otherwise imprinted around the periphery of the collar 35 is an angle degree scale 45, and scored on the disc 25 adjacent the scale 45 is a fiducial mark 46. Similarly applied to the disc 25 is an angle degree scale 47. Detachably fastened to the cylinder wall 19 adjacent the disc 25 and its scale 47, by a knurled screw 48 is a combination clamp and pointer 49 serving to index and clamp the disc 25 in any desired angular position relative to the hohlraum.

*Reference and sample mounting assembly*

Threaded to the inner end of the hollow shaft 33 is cylindrical reference and sample or test material mount 51. Formed on the lower side of the mount 51 is a cooling fluid recess or chamber 52 bounded by a circular flange 53. Recessed in the flange 53 is an O ring 54 and threaded into the mount 51 is an annular sample or test material clamp 55 provided with a feathered inner flange 56. This construction therefore serves as a means for quickly clamping and sealing a circular sheet 57 of sample or test material over the cooling fluid recess or chamber 52.

Extending through the hollow shaft 33 and threaded into the mount 51 are coolant circulating tubes 58 and 59 respectively communicating with the recess 52 through conduits 61 and 62 formed in the mount 51. The ends of the tubes 58 and 59 external to the hohlraum are arranged to be connected with a suitable source of coolant fluid under pressure. As a result of this construction the test or sample sheet 57 can be maintained at the ambient temperature or any other desired temperature independently of the hohlraum temperature.

Mounted on the opposite side of the mount 51, and preferably at an angle of 180° away from the sheet 57, are extending ceramic pins 63 and stacked thereon are a plurality of spaced, circular thermal shields 64. Mounted on the pins 63 over the thermal shields 64 is a dished, circular, ceramic guard heater 65. Embedded in the guard heater 65 is a resistance element or heater 66 connected by electrical leads 67 and 67a extending through the hollow shaft 33 and communicating with a suitable source of controlled current. Detachably mounted over the guard heater 65 is a circular sheet 68 of any desired reference material, said sheet being provided with peripherally spaced, radially extending ears or fingers 69 arranged to be bent over and around the edges of the guard heater so as to securely fasten these two members together.

Here it should be noted that the reference and test sheets 57 and 68 should be equally spaced from the axis $A_2$ of the shaft 33, and that the distance between the two axes $A_1$ and $A_2$ should be equal to the radial distance between the axis $A_2$ and the plane containing either sheet 57 or 68. As shown in FIG. 2, then, the axis $A_1$ should be contained in the plane of the outer surface of the sheet 57 and if the shaft 33 were to be rotated through 180°, the plane of the outer surface of the sheet 68 should then contain the axis $A_1$.

Here it should be noted that the shaft 33 can be bodily translated along its axis $A_2$ so as to position the mount 51 within the hohlraum at any desired point along this axis.

To determine the absolute spectral reflectance of the sample sheet 57 as a function of any angle α between the normal to the sample (a line passing through the same and paralleling the axis of the hohlraum) and the plane of the sample, the shaft is rotated through an angle α. In doing this, however, the level of every point on the sample has been changed, including all points along that diameter of the sample paralleling the shaft axis $A_2$. However, by rotating the disc through a corresponding angle, the level of the diameter in question can be returned to its original position coincident with the horizontal plane containing the axis $A_1$. The same technique can, of course, be used in conjunction with the reference sheet 68.

In addition to this the radiation from either the reference sheet or the sample sheet can be measured with the sheet located in a horizontal position, and it is also possible to measure the radiation from the hohlraum per se by moving the mount 51 to one of its two extreme positions.

By correlating the various readings taken in the above manner it is possible to determine the absolute reflectance of a test surface as a function of the angle α between the normal vector to the face of the sample and said face.

To determine the temperature of the reference sheet 68 the hot junction 71 of a thermocouple is mounted immediately adjacent the lower face of the guard heater 65. The leads 72 and 72a of the junction 71 pass through the hollow shaft 33 to a point external to the hohlraum. Although not shown, other thermocouples can be used to sense the temperatures of the hohlraum and of the test sample.

We claim:

1. A black-body radiator having a hohlraum cavity and an exit port for use with a spectrometer to measure the absolute reluctance of a specimen surface in said cavity as a function of the angle made by a normal to said surface and the line-of-sight from said surface through said exit port to said spectrometer which comprises: a shaft mount journaled in a wall of said radiator for rotation about a first axis perpendicularly intersecting said line-of-sight; a shaft journaled in said shaft mount for rotation about and movement along a second axis parallel to said first axis and spaced therefrom, said shaft extending from the exterior of said radiator into said cavity; a specimen mount on said shaft in said cavity for mounting said surface in a plane parallel to said second axis at a distance therefrom equal to the distance from said first axis to said second axis, a reference surface mount on said specimen mount for mounting a reference surface in a plane parallel to said plane of said specimen surface at a distance from said second axis equal to the distance from said first axis to said second axis; and means for measuring the angular displacement of said shaft with respect to said shaft mount and of said shaft mount with respect to said wall.

2. The black-body radiator of claim 1 and means within said specimen mount for cooling said specimen.

3. The black-body radiator of claim 2 and means within said mount for heating said reference surface and a plurality of spaced shields parallel to said reference surface between said reference surface and said second axis.

4. A specimen mounting having sidewalls, a specimen surface mounting side, a reference surface mounting side, and an axis of rotation intermediate said sides, for use in association with a black-body radiator which comprises: a plurality of spaced thermal shields mounted on said reference surface mounting side parallel to said axis; means for mounting said reference surface parallel to said shields and exterior thereof; means for heating said reference surface intermediate said thermal shields and said reference surface mounting means; means for mounting said specimen surface parallel to said reference surface at a distance from said axis equal to the distance from said axis to said reference surface; said specimen surface and said specimen mounting surface side defining a cavity, and means for circulating a coolant in said cavity.

5. A specimen mounting having sidewalls, a specimen surface mounting side, a reference surface mounting side, and an axis of rotation intermediate said sides, for use in association with a black-body radiator, which comprises: a plurality of spaced parallel thermal shields mounted on said reference surface mounting side parallel to said axis; a heater guard having a plane side and an opposite concave side mounted parallel to said thermal shields with said plane side adjacent thereto; a heating element in said heater guard; a reference surface mounted on said heater guard and defining a heating cavity with said concave surface; a specimen mounted to said specimen surface mounting side with an exposed specimen surface parallel to said reference surface at a distance from said axis equal to the distance from said axis to said reference surface; said specimen and said specimen surface mounting side defining a cooling cavity; and means for circulating a coolant in said cooling cavity.

6. The black-body radiator of claim 1 wherein said specimen mount includes a plurality of spaced thermal shields mounted on said specimen mount parallel to said second axis and intermediate said second axis and said means for mounting said reference surface; means for heating said reference surface intermediate said thermal shields and said reference surface mounting means; a specimen surface mounted on said specimen mount; said specimen mount and said specimen defining a cavity; and means for circulating a coolant in said cavity.

References Cited by the Examiner

UNITED STATES PATENTS

| | | | |
|---|---|---|---|
| 2,494,078 | 1/50 | Woodruff | 88—14 |
| 2,667,806 | 2/54 | Gier et al. | 88—14 |
| 2,849,619 | 8/58 | Eisfeldt | 250—49.5 |

FOREIGN PATENTS 943,659    5/56    Germany.

OTHER REFERENCES

"High Temperature Microscope Stage," by Sundquist, volume 31, No. 4, The Review of Scientific Instruments, April 1960, pages 425–427.

JEWELL H. PEDERSEN, *Primary Examiner.*

EMIL S. ANDERSON, *Examiner.*